(12) United States Patent
Sung et al.

(10) Patent No.: US 8,418,488 B2
(45) Date of Patent: Apr. 16, 2013

(54) METHOD FOR CONTROLLING OF REFRIGERATOR

(75) Inventors: Ji Won Sung, Seoul (KR); Chan Ho Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 746 days.

(21) Appl. No.: 12/593,665

(22) PCT Filed: Jan. 26, 2008

(86) PCT No.: PCT/KR2008/000493
§ 371 (c)(1),
(2), (4) Date: Feb. 1, 2010

(87) PCT Pub. No.: WO2008/120865
PCT Pub. Date: Oct. 9, 2008

(65) Prior Publication Data
US 2010/0152902 A1    Jun. 17, 2010

(30) Foreign Application Priority Data

Mar. 30, 2007  (KR) .................. 10-2007-0031658

(51) Int. Cl.
*F25B 49/00* (2006.01)
(52) U.S. Cl.
USPC .......................................... 62/199; 62/228.1

(58) Field of Classification Search ............... 62/174, 62/199, 200, 288.1, 228.5
See application file for complete search history.

(56) References Cited

U.S. PATENT DOCUMENTS

| 6,397,608 | B1* | 6/2002 | Sakuma et al. | 62/158 |
| 2005/0183429 | A1* | 8/2005 | Rafalovich et al. | 62/155 |
| 2006/0218952 | A1* | 10/2006 | Nagae et al. | 62/216 |

FOREIGN PATENT DOCUMENTS

| JP | 2001-082851 | 3/2001 |
| JP | 2001-355955 | 12/2001 |
| JP | 2004-037065 | 2/2004 |

OTHER PUBLICATIONS

International Search Report dated May 23, 2008.

* cited by examiner

*Primary Examiner* — Marc Norman
(74) *Attorney, Agent, or Firm* — KED & Associates LLP

(57) ABSTRACT

According to a method of controlling a refrigerator in accordance with the present invention, after the refrigerating chamber and the freezing chamber are operated at the same time, refrigerant recovery is performed and the refrigerating chamber is then cooled. Accordingly, imbalance due to the pressure difference between the refrigerating chamber evaporator and the freezing chamber evaporator can be solved. Further, there is an advantage in that the refrigerating chamber can be cooled rapidly since refrigerant is supplied to the refrigerating chamber smoothly.

13 Claims, 7 Drawing Sheets

US 8,418,488 B2

METHOD FOR CONTROLLING OF REFRIGERATOR

TECHNICAL FIELD

The present invention relates to a method of controlling a refrigerator and, more particularly, to a method of controlling a refrigerator, in which, after a simultaneous operation for cooling a refrigerating chamber and a freezing chamber, refrigerant recovery is performed, so that subsequent cooling of the refrigerating chamber or the freezing chamber can be performed more efficiently.

BACKGROUND ART

In general, a refrigerator includes a compressor, a condenser for condensing refrigerant compressed in the compressor, an expansion valve for expanding the refrigerant condensed in the condenser, an evaporator for evaporating the refrigerant expanded in the expansion valve, and a ventilation fan for ventilating the air through the evaporator in order to improve the evaporation efficiency of the refrigerant introduced into the evaporator.

In this case, when the compressor is driven again after being stopped, the refrigerator performs a refrigerant recovery operation for gathering refrigerant toward the compressor in order to minimize the refrigerant accumulated in the pipeline or the evaporator.

DISCLOSURE OF INVENTION

Technical Problem

An object of the present invention is to provide a method of controlling a refrigerator, in which, after a simultaneous operation for cooling a refrigerating chamber and a freezing chamber, refrigerant recovery is performed, so that subsequent cooling of the refrigerating chamber or the freezing chamber can be performed more efficiently.

Technical Solution

The present invention provides a method of controlling a refrigerator, including the steps of preparing a main body partitioned into a refrigerating chamber and a freezing chamber, a refrigerating chamber evaporator disposed in the refrigerating chamber, a freezing chamber evaporator disposed in the freezing chamber, a compressor for supplying refrigerant to the refrigerating chamber evaporator and the freezing chamber evaporator; and a 3-way valve for controlling the refrigerant introduced from the compressor to the freezing chamber/refrigerating chamber evaporators, checking temperatures of the refrigerating chamber and the freezing chamber and determining a simultaneous operation condition of the refrigerating chamber and the freezing chamber, and after the determination of the simultaneous operation condition, recovering the refrigerant toward the compressor by closing the 3-way valve and driving the compressor.

In this case, after the refrigerant recovery step, the steps of determining an operation condition of the refrigerating chamber, and in the case of the refrigerating chamber operation condition, cooling the refrigerating chamber can be included. After the refrigerating chamber cooling step, the steps of determining an operation condition of the freezing chamber, and, in the case of the freezing chamber operation condition, cooling the freezing chamber can be included. After the cooling step of the freezing chamber, the step of recovering the refrigerant toward the compressor by closing the 3-way valve and driving the compressor can be further included.

Further, after the refrigerant recovery step, the steps of determining an operation condition of the freezing chamber, and in the case of the freezing chamber operation condition, cooling the freezing chamber can be further included. After the cooling step of the freezing chamber, the step of recovering the refrigerant toward the compressor by closing the 3-way valve and driving the compressor can be further included In particular, when temperatures of the refrigerating chamber and the freezing chamber satisfy the simultaneous operation condition, the refrigerating chamber and the freezing chamber can be cooled at the same time.

A method of controlling a refrigerator according to another aspect of the present invention can include the steps of preparing a main body partitioned into a refrigerating chamber and a freezing chamber, a refrigerating chamber evaporator disposed in the refrigerating chamber, a freezing chamber evaporator disposed in the freezing chamber, a compressor for supplying refrigerant to the refrigerating chamber evaporator and the freezing chamber evaporator; and a 3-way valve for controlling the refrigerant introduced from the compressor to the freezing chamber evaporator and the refrigerating chamber evaporator, checking temperatures of the refrigerating chamber and the freezing chamber and operating the refrigerating chamber and the freezing chamber at the same time, and after the simultaneous operation of the refrigerating chamber and the freezing chamber, recovering the refrigerant toward the compressor by closing the 3-way valve and driving the compressor.

After the refrigerant recovery step, the steps of cooling the refrigerating chamber, and after the cooling of the refrigerating chamber, cooling the freezing chamber can be further performed. After the refrigerant recovery step, the step of cooling the freezing chamber can be further performed. After the cooling of the freezing chamber, the step of further performing the refrigerant recovery step can be further performed.

A method of controlling a refrigerator according to still another aspect of the present invention can include the steps of a step of preparing a main body partitioned into a refrigerating chamber and a freezing chamber, a refrigerating chamber evaporator disposed in the refrigerating chamber, a freezing chamber evaporator disposed in the freezing chamber, a compressor for supplying refrigerant to the refrigerating chamber evaporator and the freezing chamber evaporator; and a 3-way valve for controlling the refrigerant introduced from the compressor to the freezing chamber evaporator and the refrigerating chamber evaporator, a refrigerant recovery step of recovering the refrigerant toward the compressor by closing the 3-way valve and driving the compressor, a step of, after the refrigerant recovery step, cooling the refrigerating chamber by supplying the refrigerant to the refrigerating chamber evaporator, and a step of, after the cooling of the refrigerating chamber, cooling the freezing chamber by supplying the refrigerant to the freezing chamber evaporator.

A method of controlling a refrigerator according to still another aspect of the present invention can include the steps of a step of preparing a main body partitioned into a refrigerating chamber and a freezing chamber, a refrigerating chamber evaporator disposed in the refrigerating chamber, a freezing chamber evaporator disposed in the freezing chamber, a compressor for supplying refrigerant to the refrigerating chamber evaporator and the freezing chamber evaporator; and a 3-way valve for controlling the refrigerant introduced from the compressor to the freezing chamber evaporator and the refrigerating chamber evaporator, a refrigerant recovery step of recovering the refrigerant toward the compressor by closing the 3-way valve and driving the compressor, a step of, after the refrigerant recovery step, cooling the freezing chamber by supplying the refrigerant to the freezing chamber evaporator, and a step of, after the cooling of the freezing chamber, cooling the refrigerating chamber by supplying the refrigerant to the refrigerating chamber evaporator.

ADVANTAGEOUS EFFECTS

According to the method of controlling the refrigerator in accordance with the present invention, after the refrigerating chamber and the freezing chamber are operated at the same time, refrigerant recovery is performed and the refrigerating chamber is then cooled. Accordingly, imbalance due to the pressure difference between the refrigerating chamber evaporator and the freezing chamber evaporator can be solved. Further, there is an advantage in that the refrigerating chamber can be cooled rapidly since refrigerant is supplied to the refrigerating chamber smoothly.

BEST MODE FOR CARRYING OUT THE INVENTION

The present invention will now be described in detail in connection with preferred embodiments with reference to the accompanying drawings.

Figure 1:
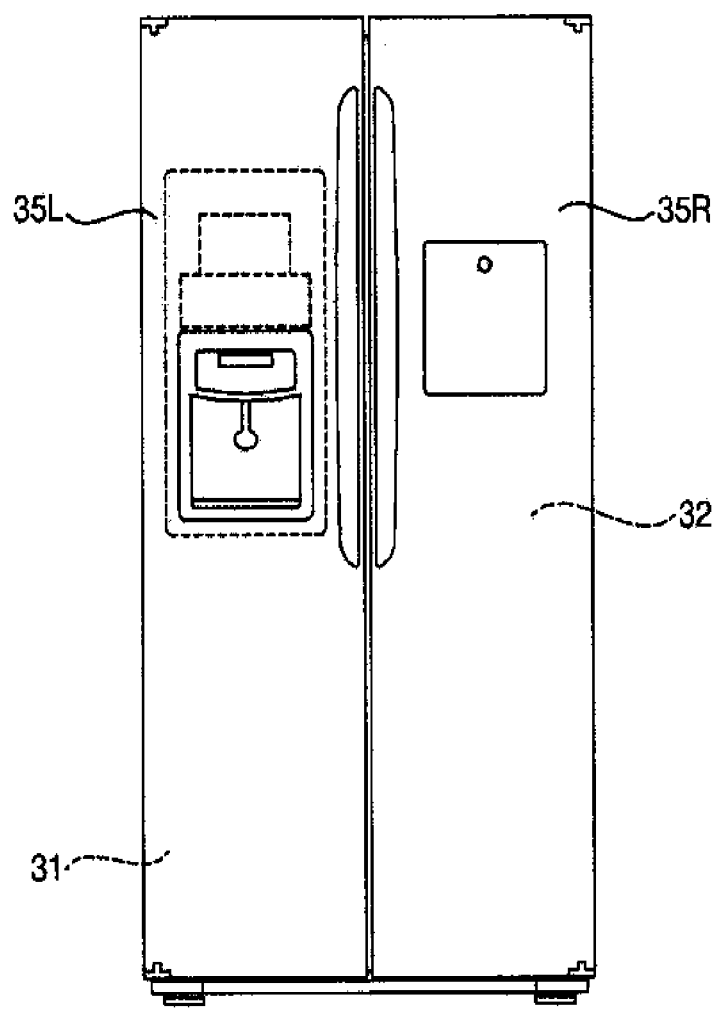
FIG. 1 is a front view showing a refrigerator in accordance with an embodiment of the present invention.
Figure 2:
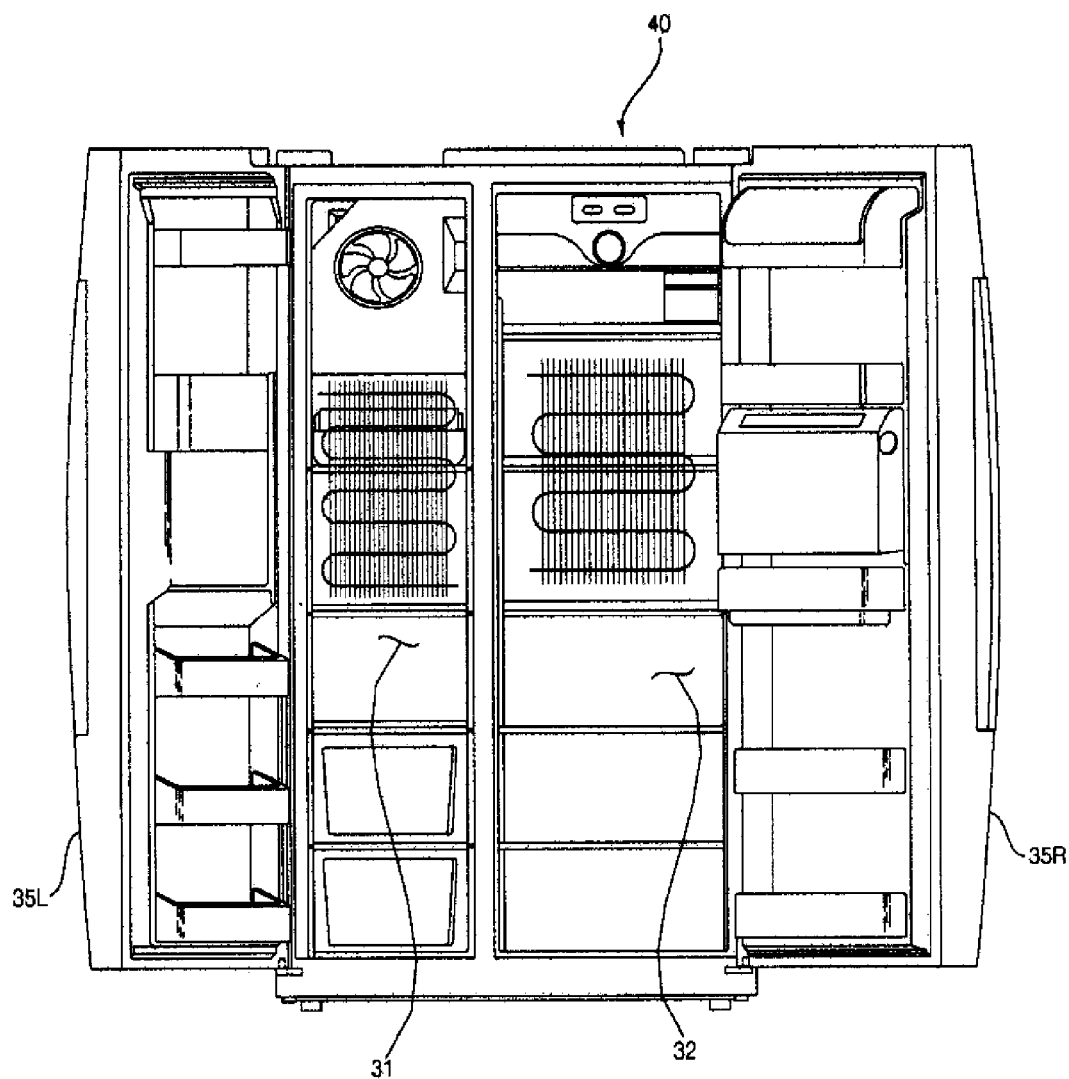
FIG. 2 is a front view showing the inside of the refrigerator shown in FIG. 1.

FIG. 1 is a front view showing a refrigerator in accordance with an embodiment of the present invention. FIG. 2 is a front view showing the inside of the refrigerator shown in FIG. 1.

As shown in FIG. 1 or 2, the refrigerator in accordance with the present invention includes a main body 40 provided with a freezing chamber 31 and a refrigerating chamber 32, and doors 35L and 35R hinged to the main body 40 and configured to open/close the freezing chamber 31 and the refrigerating chamber 32, respectively.

Here, the freezing chamber 31 and the freezing chamber 32 are separated from each other by a barrier rib 33 disposed in the main body 40 in order to prevent cooling air within each chamber from flowing through the chamber on the other side. A freezing chamber evaporator and a refrigerating chamber evaporator for cooling respective spaces are disposed in the freezing chamber 31 and the refrigerating chamber 32, respectively.

Figure 3:
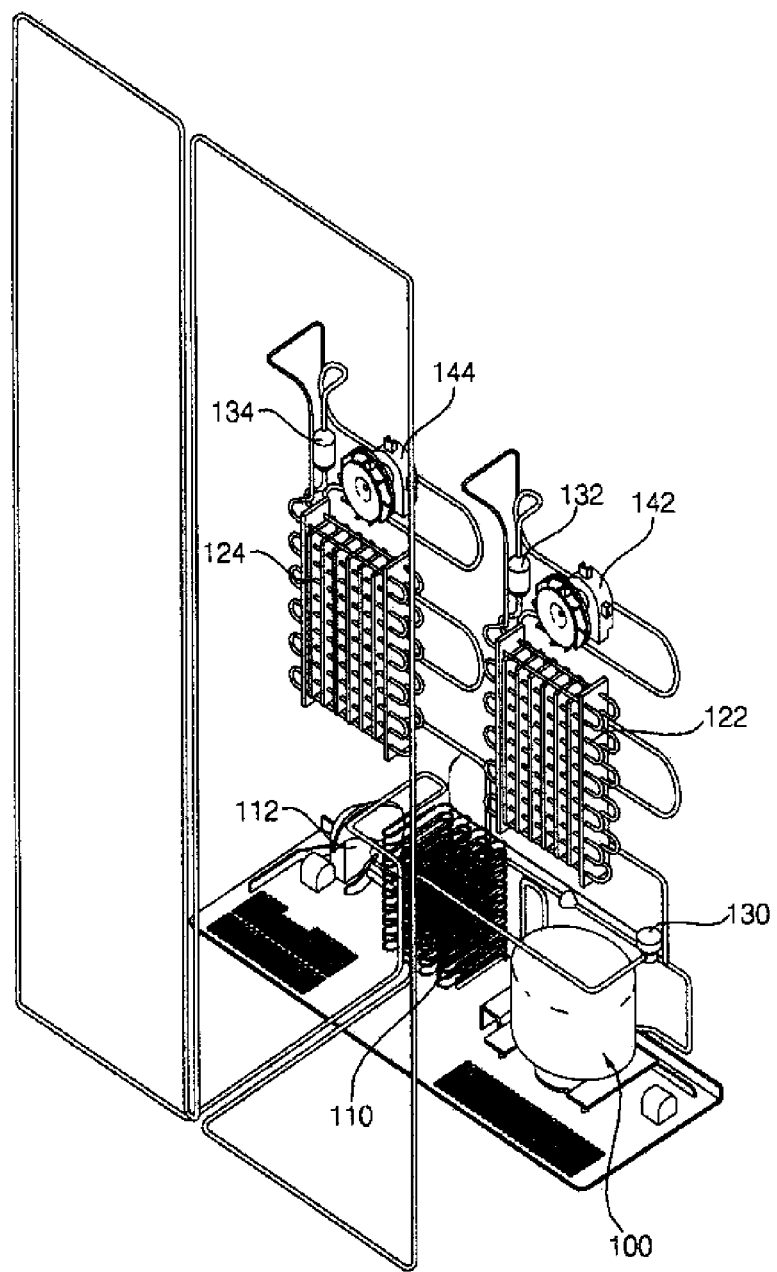
FIG. 3 is a perspective view showing respective apparatuses of the refrigerator shown in FIG. 1.
Figure 4:
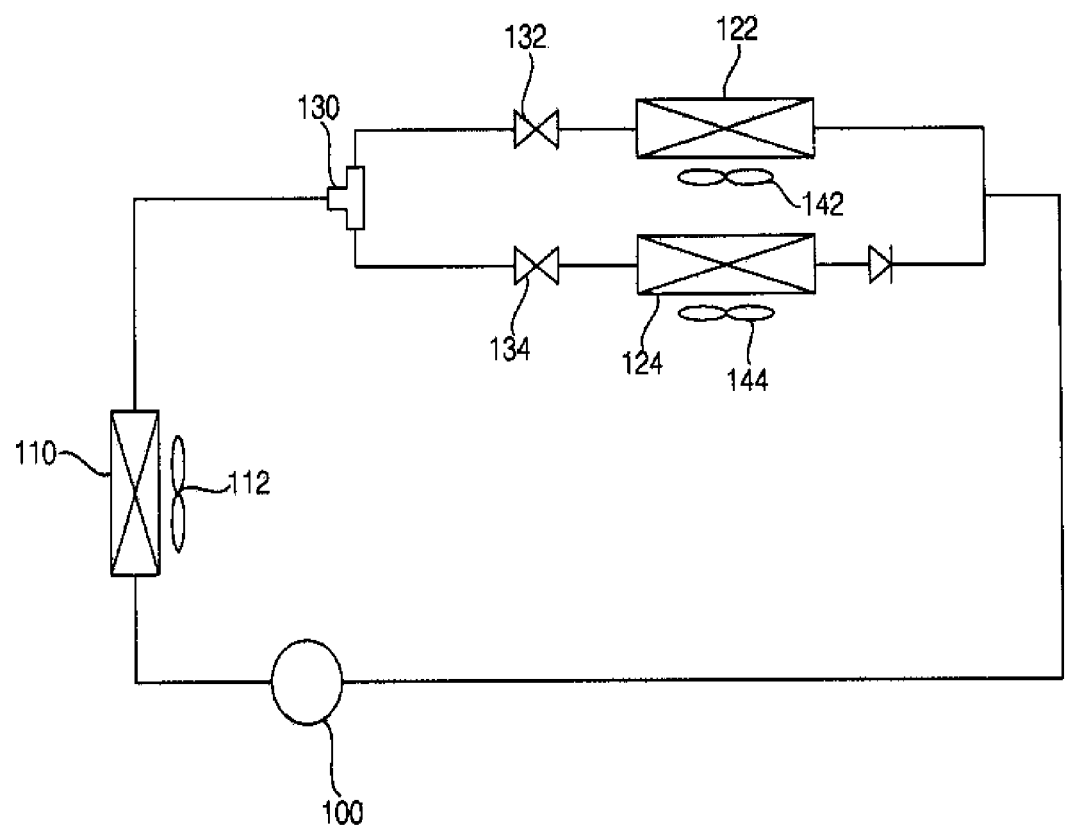
FIG. 4 shows a configuration of the refrigerator shown in FIG. 3.

FIG. 3 is a perspective view showing respective apparatuses of the refrigerator shown in FIG. 1. FIG. 4 shows a configuration of the refrigerator shown in FIG. 3.

As shown in FIG. 3 or 4, the refrigerator in accordance with the present embodiment includes a compressor 100, a condenser 110 for condensing refrigerant compressed in the compressor 100, a freezing chamber evaporator 124 configured to evaporate the refrigerant condensed in the condenser 110 and disposed in the freezing chamber 31, a refrigerating chamber evaporator 122 configured to evaporate the refrigerant condensed in the condenser 110 and disposed in the refrigerating chamber 32, a 3-way valve 130 for supplying the refrigerant condensed in the condenser 110 to the refrigerating chamber evaporator 122 or the freezing chamber evaporator 124, a refrigerating chamber expansion valve 132 for expanding the refrigerant supplied to the refrigerating chamber evaporator 122, and a freezing chamber expansion valve 134 for expanding the refrigerant supplied to the freezing chamber evaporator 124.

Here, the refrigerating chamber 32 is equipped with a refrigerating chamber fan 142 for improving the heat exchange efficiency of the refrigerating chamber evaporator 122 and circulating the air within the refrigerating chamber 32. Further, the freezing chamber 31 is equipped with a freezing chamber fan 144 for improving the heat exchange efficiency of the freezing chamber evaporator 124 and circulating the air within the freezing chamber 31.

Further, a check valve 150 for preventing the introduction of the refrigerant of the freezing chamber evaporator 124 is disposed on the discharge side of the refrigerating chamber evaporator 122.

The 3-way valve 130 can be opened/closed in order to select the flow passage of the refrigerant supplied from the condenser 110. The 3-way valve 130 can open or close either the refrigerating chamber expansion valve 132 or the freezing chamber expansion valve 134.

Here, the refrigerating chamber-side flow passage of the 3-way valve 130 is called a "R valve 131", a freezing chamber-side flow passage is called a "F valve 133", the opening/closing of the refrigerating chamber-side flow passage are called on/off of the R valve 131, and the opening/closing of the freezing chamber-side flow passage are called on/off of the F valve 133.

Meanwhile, although the 3-way valve has been disposed in the present embodiment, an opening/closing valve can be disposed in each of pipelines connected to the refrigerating chamber/freezing chamber evaporators 122 and 124, instead of the 3-way valve.

Hereinafter, a method of controlling the refrigerator in accordance with the present invention is described in detail with reference to FIGS. 3 to 6.

Figure 5:
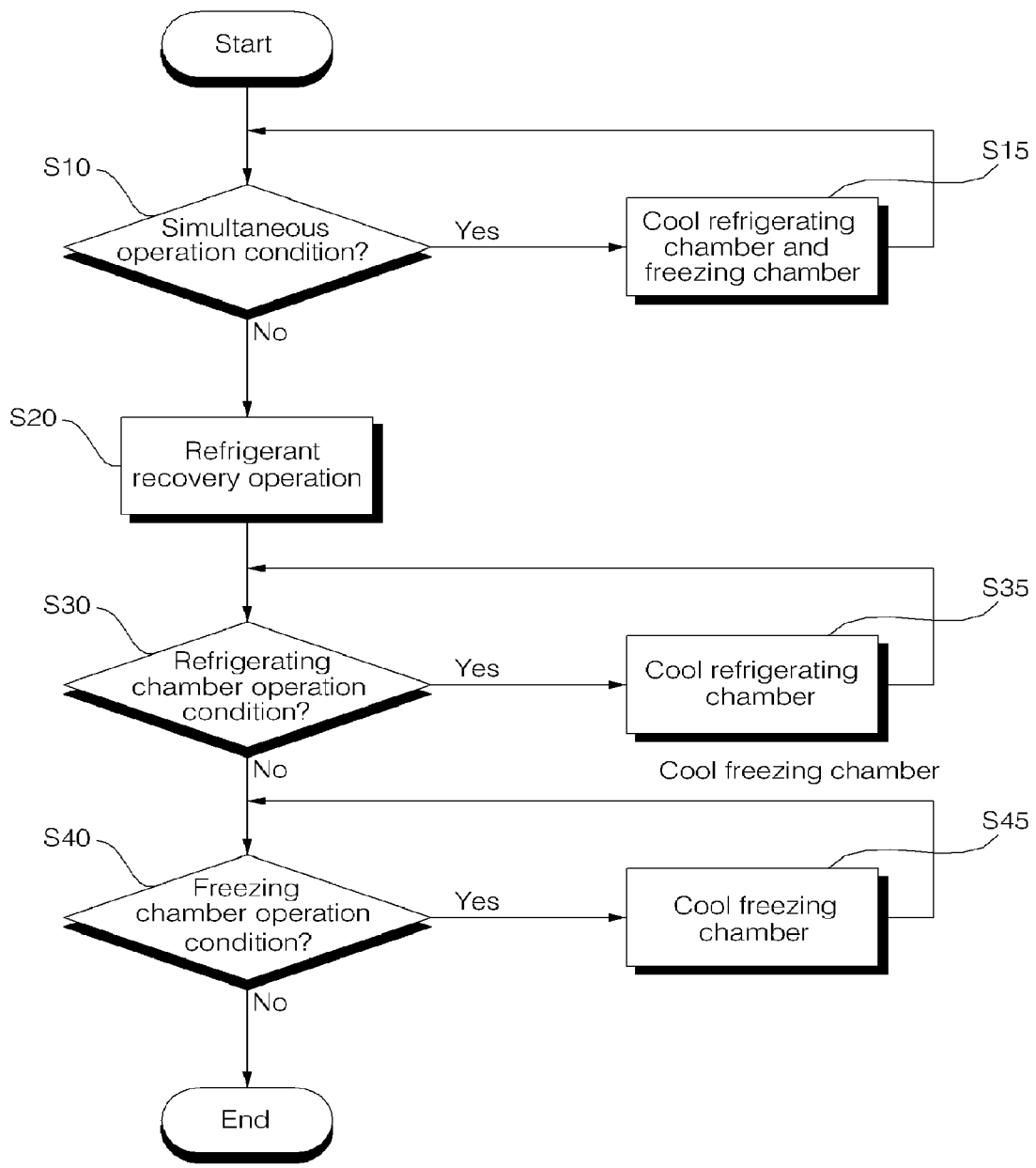
FIG. 5 is a flowchart showing a method of controlling the refrigerator in accordance with an embodiment of the present invention.
Figure 6:
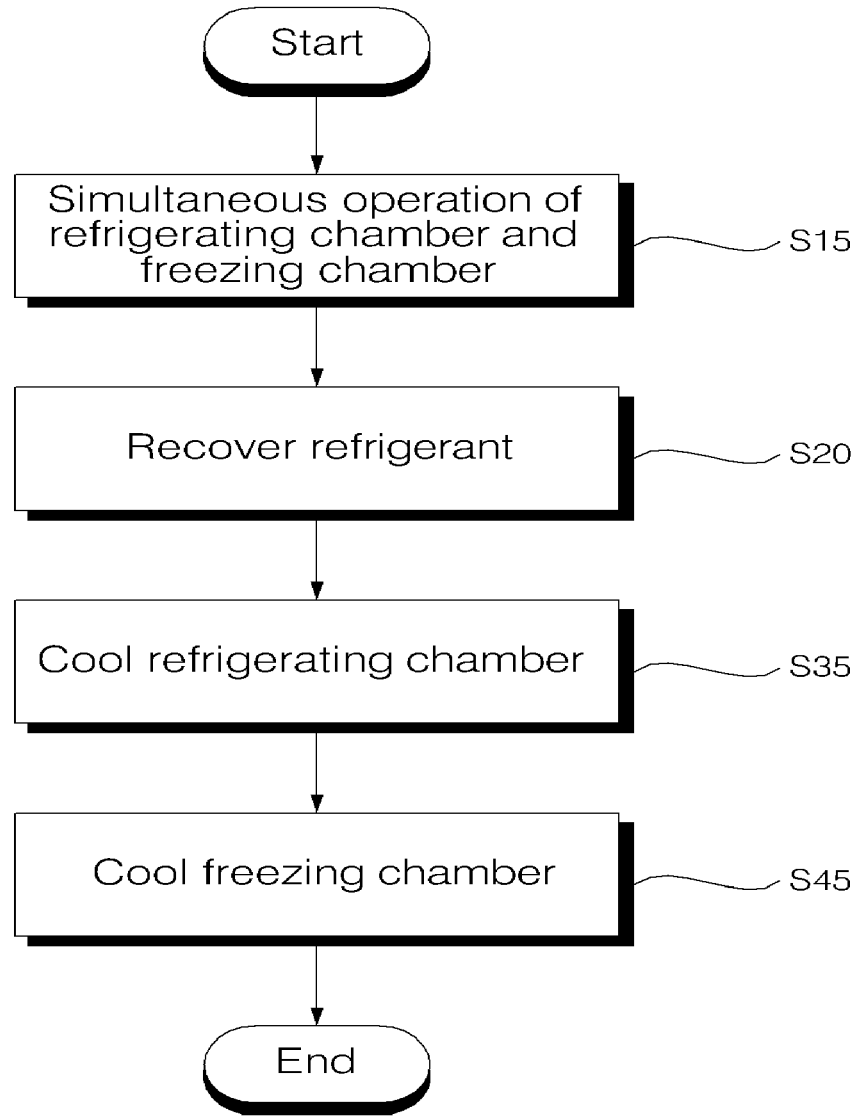
FIG. 6 is a flowchart showing an operation process of the refrigerator shown in FIG. 5.

FIG. 5 is a flowchart showing a method of controlling the refrigerator in accordance with an embodiment of the present invention. FIG. 6 is a flowchart showing an operation process of the refrigerator in accordance with the present embodiment.

First, when power source is applied to the refrigerator, the controller (not shown) of the refrigerator senses temperatures of the refrigerating chamber 32 and the freezing chamber 31. The controller determines a simultaneous operation condition by comparing temperatures, sensed in the freezing chamber 31 and the refrigerating chamber 32, and target temperature regions within the respective chambers (S10).

If, as a result of the determination, the temperature within each chamber is higher than the target temperature region of each chamber by a predetermined temperature or more, the controller calculates load within each chamber according to a temperature difference and then actuates the compressor 100.

In this case, in the simultaneous operation of the freezing chamber 31 and the refrigerating chamber 32, the controller opens both the R valve 131 and the F valve 133 of the 3-way valve 130 upon initial start-up such that the freezing chamber 31 and the refrigerating chamber 32 are cooled at the same time. Accordingly, refrigerant is supplied to both the refrigerating chamber evaporator 122 and the freezing chamber evaporator 124 (S15).

In particular, the simultaneous operation can be performed upon initial start-up of the refrigerator or when the refrigerator is actuated again after electrical power failure.

Further, after the simultaneous operation condition is determined (S10), the controller performs a refrigerant recovery operation irrespective of whether the simultaneous operation is performed (S20).

In this case, before the refrigerant recovery operation (S20), the controller senses a temperature within each chamber and then operates the compressor 100. The controller performs refrigerant recovery before cooling of the freezing chamber 31 or the refrigerating chamber 32.

In the present embodiment, a priority is given to cooling of the refrigerating chamber 32, of the freezing chamber 31 and the refrigerating chamber 32. Accordingly, after the refrigerant recovery operation (S20), the refrigerating chamber 32 is cooled (S35).

At this time, the reason why the refrigerant recovery step (S20) is performed is to prevent cooling of the refrigerating chamber 32 from being performed before the temperature within each chamber is sensed, that is, in a cooling cycle immediately after cooling of the freezing chamber 31 is performed in a cooling cycle of a previous step.

For example, if the operation of the compressor 100 is finished after the freezing chamber 31 is cooled, refrigerant supplied to the freezing chamber evaporator 124 remains intact and is slowly evaporated by a temperature change within the chamber. Further, a temperature of the refrigerating chamber evaporator 122 to which the refrigerant has not been supplied rises slowly. Accordingly, there occurs a pressure difference between the refrigerating chamber evaporator 122 and the freezing chamber evaporator 124.

In this case, an internal pressure of the freezing chamber evaporator 124 becomes lower than that of the refrigerating chamber evaporator 122. Accordingly, although refrigerant is supplied to the refrigerating chamber evaporator 122 in order to cool the refrigerating chamber 32 when the compressor 100 is operated for cooling of the refrigerating chamber 32, the refrigerant supplied to the refrigerating chamber evaporator 122 is discharged by the pressure difference between the evaporators 122 and 124 and then moves to the freezing chamber evaporator 124. Furthermore, the refrigerant does not move to the refrigerating chamber evaporator 122 smoothly due to pressure imbalance between the freezing chamber evaporator 124 and the refrigerating chamber evaporator 122.

Accordingly, the refrigerant recovery step (S20) of the refrigerator in accordance with the present embodiment is performed in such a way as to close both the R valve and the F valve by controlling the 3-way valve 130, while the compressor 100 is being operated, and drive the freezing chamber fan 144 at low speed.

If the discharge sides of the 3-way valve 130 are all closed, refrigerant is not supplied to the refrigerating chamber/freezing chamber evaporators 122 and 124. In a state where the supply of the refrigerant to the refrigerating chamber/freezing chamber evaporators 122 and 124 is cut off, any one of the refrigerating chamber fan 142 and the freezing chamber fan 144 is actuated.

Here, in the present embodiment, after the refrigerant recovery step (S20), cooling of the refrigerating chamber 32 is performed. It is preferred that an internal pressure of the freezing chamber evaporator 124 be raised in order to reduce the pressure difference between the freezing chamber evaporator 124 and the refrigerating chamber evaporator 122.

Accordingly, the refrigerant remaining within the freezing chamber evaporator 124 is evaporated by the driving of the freezing chamber fan 144, and an internal pressure of the freezing chamber evaporator 124 is raised by heat exchange. Consequently, the refrigerant of the freezing chamber evaporator 124 moves toward the compressor 100.

Further, although the refrigerating chamber fan 142 is not additionally operated, the pressure of the refrigerating chamber evaporator 122 is higher than that of the freezing chamber evaporator 124. Accordingly, when the compressor 100 is actuated, the refrigerant remaining within the refrigerating chamber evaporator 122 moves toward the compressor 100 smoothly.

If the compressor 100 is driven in this state, most of the refrigerant remaining in the pipeline, which connects the 3-way valve 130, the expansion valves 132 and 134, and the refrigerating chamber/freezing chamber evaporators 122 and 124, and from the refrigerating chamber/freezing chamber evaporators 122 and 124 to the compressor 100, is stored between the discharge side of the compressor 100 and the 3-way valve 130.

In particular, in the present embodiment, upon recovery of refrigerant, the freezing chamber fan 144 is driven in a state where the condenser fan 112 for ventilating the air into the condenser 110 is being stopped.

In this case, such driving of the condenser fan 112 causes to raise an internal pressure on the condenser (110) side. This is because when recovering refrigerant, an adverse effect is generated.

Meanwhile, after the refrigerant recovery step (S20), the controller senses a temperature of the refrigerating chamber 32 and determines a refrigerating chamber operation condition based on the sensed temperature (S30).

If, as a result of the determination, the sensed temperature of the refrigerating chamber is higher than a refrigerating chamber target temperature region by a predetermined temperature, the controller determines the refrigerating chamber operation condition and introduces refrigerant into the refrigerating chamber evaporator 122, thus cooling the refrigerating chamber 32 (S35).

In the refrigerating chamber cooling step (S35), the controller opens the R valve 131 so that refrigerant gathered on the compressor (100) side can be introduced into the refrigerating chamber evaporator 122 through the opened R valve 131. In particular, the pressure difference between the freezing chamber evaporator 124 and the refrigerating chamber evaporator 122 has been solved through the refrigerant recovery step (S20) performed before the refrigerating chamber cooling step (S35). Accordingly, not only the refrigerant can move to the refrigerating chamber evaporator 122 smoothly, but also the refrigerating chamber evaporator 122 can be evaporated effectively.

Next, after the refrigerating chamber operation condition is determined (S20), the controller senses a temperature of the freezing chamber 31 and determines a freezing chamber operation condition based on the sensed temperature (S40).

If, as a result of the determination, the sensed temperature of the freezing chamber is higher than a target temperature region of the freezing chamber by a predetermined temperature, the controller determines the freezing chamber operation condition. Accordingly, the controller opens the F valve 133 and introduces refrigerant into the freezing chamber evaporator 124, thus cooling the freezing chamber 31 (S45).

Meanwhile, in the case in which, when the refrigerant recovery step S20 is performed, refrigerant recovery is performed by driving at least any one of the refrigerating chamber fan 142 and the freezing chamber fan 144, there is an advantage in that air circulation of the freezing chamber 31 and the refrigerating chamber 32 can be performed at the same time.

Meanwhile, in the case in which the condenser fan 112 disposed for heat exchange of the condenser 110 is driven at low speed, there are problems that not only resonance of the refrigerator is caused, but also noise generated when the condenser fan 112 is driven diffuses into the room because a machine chamber (not shown) in which the condenser 110 is disposed communicates with the room.

On the other hand, in the case in which the refrigerating chamber fan 142 or the freezing chamber fan 144 is driven, there is an additional advantage in that a drain of noise can be prevented because the refrigerating chamber fan 142 or the freezing chamber fan 144 is disposed within the main body 40 of the refrigerator.

As shown in FIGS. 5 and 6, the operation process of the refrigerator in the present embodiment is described below.

First, simultaneous cooling of the refrigerating chamber 32 and the freezing chamber 31 is performed (S10). After the simultaneous cooling, the refrigerant recovery operation for recovering refrigerant of the refrigerating chamber evaporator 122 and the freezing chamber evaporator 124 is performed (S20). After the refrigerant recovery operation, cooling of the refrigerating chamber 32 is performed. After the cooling of the refrigerating chamber 32, cooling of the freezing chamber 31 is performed. Thereafter, when a temperature within each chamber meets each target temperature region, the compressor 100 is turned off.

Figure 7:
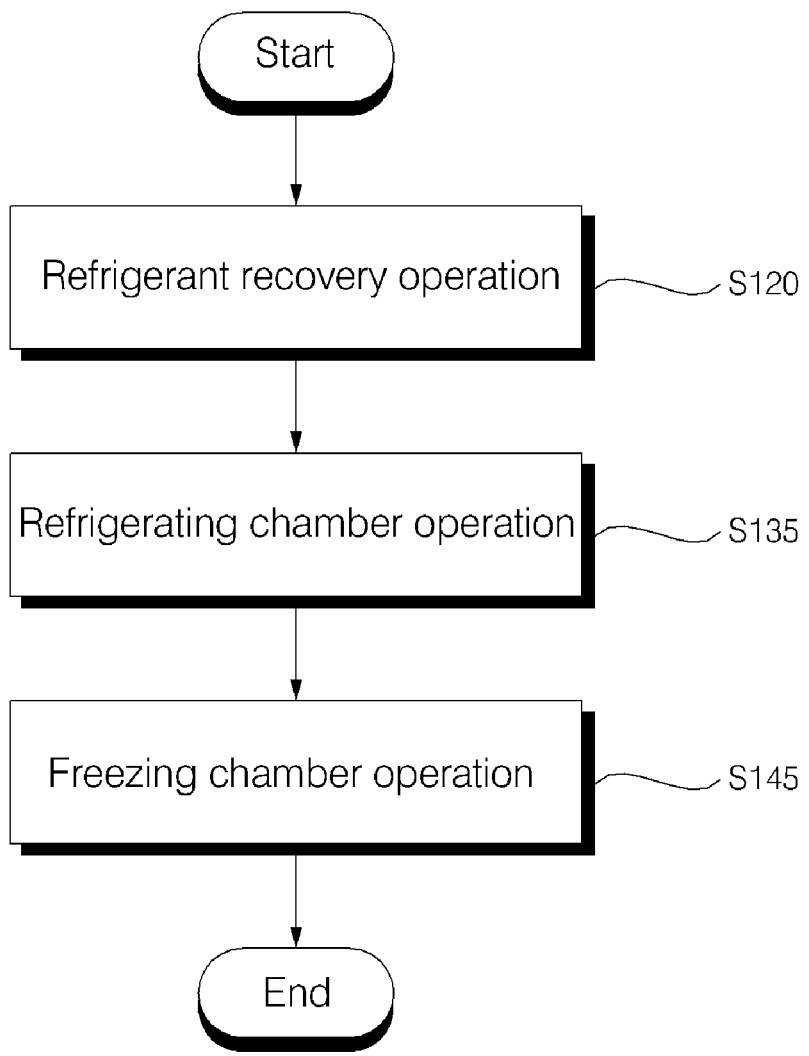
FIG. 7 is a flowchart showing an operation process of the refrigerator in accordance with another embodiment of the present invention.

FIG. 7 is a flowchart showing an operation process of the refrigerator in accordance with another embodiment of the present invention.

The present embodiment illustrates an operation process of the refrigerator when the simultaneous operation is not performed, unlike the above embodiment.

In this case, after the operation of the above one embodiment is performed, when the controller senses load of the refrigerator, the compressor 100 is actuated again. When simultaneous cooling of the refrigerating chamber 32 and the freezing chamber 31 is not required, a refrigerant recovery operation (S120) is performed.

In other words, when the simultaneous operation (S10) is not performed, after the refrigerant recovery operation (S120) is performed, the refrigerating chamber 32 is cooled (S135). After the cooling of the refrigerating chamber, the freezing chamber 31 is cooled (S145).

Hereinafter, the operation and effects according to each step are identical to those of the above one embodiment and detailed description thereof is omitted.

Meanwhile, although it has not been described in the embodiment, refrigerant recovery can be performed after the simultaneous operation of the refrigerating chamber and the freezing chamber, and the freezing chamber can be operated after the refrigerant recovery. Accordingly, recovered refrigerant can be introduced into the freezing chamber evaporator effectively.

Further, in the case in which cooling of the freezing chamber is performed finally during the operation process of the refrigerator, even though refrigerant recovery is performed after the freezing chamber is cooled, an effective cycle can be implemented when the compressor is driven subsequently.

Moreover, the present invention is not limited to the disclosed embodiments and drawings, but can be modified by those skilled in the art within the scope and spirit of the invention.

INDUSTRIAL APPLICABILITY

The present invention can be used in refrigerators, which can perform cooling more efficiently with respective to subsequent cooling of the refrigerating chamber or the freezing chamber by performing recovery of refrigerant after a simultaneous cooling operation is performed on the refrigerating chamber and the freezing chamber.

The invention claimed is:

1. A method of controlling a refrigerator, comprising the steps of preparing a main body partitioned into a refrigerating chamber and a freezing chamber, a refrigerating chamber evaporator disposed in the refrigerating chamber, a freezing chamber evaporator disposed in the freezing chamber, a compressor for supplying refrigerant to the refrigerating chamber evaporator and the freezing chamber evaporator; and a 3-way valve for controlling the refrigerant introduced from the compressor to the freezing chamber/refrigerating chamber evaporators;
   checking temperatures of the refrigerating chamber and the freezing chamber and determining a simultaneous operation condition of the refrigerating chamber and the freezing chamber; and
   after the determination of the simultaneous operation condition, recovering the refrigerant toward the compressor by closing the 3-way valve and driving the compressor.

2. The method according to claim 1, further comprising the steps of:
   after the refrigerant recovery step,
   determining an operation condition of the refrigerating chamber; and
   in the case of the refrigerating chamber operation condition, cooling the refrigerating chamber.

3. The method according to claim 2, further comprising the steps of:
   after the refrigerating chamber cooling step,
   determining an operation condition of the freezing chamber; and
   in the case of the freezing chamber operation condition, cooling the freezing chamber.

4. The method according to claim 3, further comprising the step of, after the cooling step of the freezing chamber, recovering the refrigerant toward the compressor by closing the 3-way valve and driving the compressor.

5. The method according to claim 1, further comprising the steps of
   after the refrigerant recovery step,
   determining an operation condition of the freezing chamber; and
   in the case of the freezing chamber operation condition, cooling the freezing chamber.

6. The method according to claim 5, further comprising the step of, after the cooling step of the freezing chamber, recovering the refrigerant toward the compressor by closing the 3-way valve and driving the compressor.

7. The method according to claim 1, wherein, when the temperatures of the refrigerating chamber and the freezing chamber satisfy the simultaneous operation condition, the refrigerating chamber and the freezing chamber are cooled at the same time.

8. A method of controlling a refrigerator, comprising the steps of:

preparing a main body partitioned into a refrigerating chamber and a freezing chamber, a refrigerating chamber evaporator disposed in the refrigerating chamber, a freezing chamber evaporator disposed in the freezing chamber, a compressor for supplying refrigerant to the refrigerating chamber evaporator and the freezing chamber evaporator; and a 3-way valve for controlling the refrigerant introduced from the compressor to the freezing chamber evaporator and the refrigerating chamber evaporator;

checking temperatures of the refrigerating chamber and the freezing chamber and operating the refrigerating chamber and the freezing chamber at the same time; and after the simultaneous operation of the refrigerating chamber and the freezing chamber, recovering the refrigerant toward the compressor by closing the 3-way valve and driving the compressor.

9. The method according to claim 8, further comprising the steps of:

after the refrigerant recovery step, cooling the refrigerating chamber; and after the cooling of the refrigerating chamber, cooling the freezing chamber.

10. The method according to claim 9, further comprising the step of, after the cooling of the freezing chamber, further performing the refrigerant recovery step.

11. The method according to claim 8, further comprising the step of, after the refrigerant recovery step, cooling the freezing chamber.

12. A method of controlling a refrigerator, comprising:

a step of preparing a main body partitioned into a refrigerating chamber and a freezing chamber, a refrigerating chamber evaporator disposed in the refrigerating chamber, a freezing chamber evaporator disposed in the freezing chamber, a compressor for supplying refrigerant to the refrigerating chamber evaporator and the freezing chamber evaporator; and a 3-way valve for controlling the refrigerant introduced from the compressor to the freezing chamber evaporator and the refrigerating chamber evaporator;

a refrigerant recovery step of recovering the refrigerant toward the compressor by closing the 3-way valve and driving the compressor;

a step of, after the refrigerant recovery step, cooling the refrigerating chamber by supplying the refrigerant to the refrigerating chamber evaporator; and a step of, after the cooling of the refrigerating chamber, cooling the freezing chamber by supplying the refrigerant to the freezing chamber evaporator.

13. A method of controlling a refrigerator, comprising:

a step of preparing a main body partitioned into a refrigerating chamber and a freezing chamber, a refrigerating chamber evaporator disposed in the refrigerating chamber, a freezing chamber evaporator disposed in the freezing chamber, a compressor for supplying refrigerant to the refrigerating chamber evaporator and the freezing chamber evaporator; and a 3-way valve for controlling the refrigerant introduced from the compressor to the freezing chamber evaporator and the refrigerating chamber evaporator;

a refrigerant recovery step of recovering the refrigerant toward the compressor by closing the 3-way valve and driving the compressor;

a step of, after the refrigerant recovery step, cooling the freezing chamber by supplying the refrigerant to the freezing chamber evaporator; and a step of, after the cooling of the freezing chamber, cooling the refrigerating chamber by supplying the refrigerant to the refrigerating chamber evaporator.

* * * * *